United States Patent
Kim et al.

(10) Patent No.: US 10,020,953 B2
(45) Date of Patent: *Jul. 10, 2018

(54) METHOD OF TRANSMITTING/RECEIVING CONTROL MESSAGE IN A MOBILE COMMUNICATION SYSTEM PROVIDING MULTIMEDIA BROADCAST/MULTICAST SERVICE

(71) Applicant: Samsung Electronics Co., Ltd., Gyeonggi-do (KR)

(72) Inventors: Soeng-Hun Kim, Kyonggi-do (KR); Kook-Heui Lee, Kyonggi-do (KR); Sung-Ho Choi, Kyonggi-do (KR); Il Han, Kyonggi-do (KR)

(73) Assignee: Samsung Electronics Co., Ltd (KR)

( * ) Notice: Subject to any disclaimer, the term of this patent is extended or adjusted under 35 U.S.C. 154(b) by 7 days.

This patent is subject to a terminal disclaimer.

(21) Appl. No.: 14/587,487

(22) Filed: Dec. 31, 2014

(65) Prior Publication Data
US 2015/0117297 A1 Apr. 30, 2015

Related U.S. Application Data

(63) Continuation of application No. 14/324,848, filed on Jul. 7, 2014, now Pat. No. 8,929,271, which is a
(Continued)

(30) Foreign Application Priority Data

Aug. 16, 2002 (KR) .................. 10-2002-0048610

(51) Int. Cl.
*H04L 12/18* (2006.01)
*H04H 20/16* (2008.01)
(Continued)

(52) U.S. Cl.
CPC ........... *H04L 12/189* (2013.01); *H04H 20/16* (2013.01); *H04H 20/57* (2013.01); *H04W 4/06* (2013.01);
(Continued)

(58) Field of Classification Search
None
See application file for complete search history.

(56) References Cited

U.S. PATENT DOCUMENTS 5,465,391 A * 11/1995 Toyryla ................. H04W 68/08
455/450
5,878,033 A * 3/1999 Mouly ................... H04H 20/16
370/312
(Continued)

FOREIGN PATENT DOCUMENTS

EP 0944275 9/1999
EP 1 185 125 3/2002
(Continued)

OTHER PUBLICATIONS

"3rd Generation Partnership Project; Technical Specification Group Access Network; Introduction of the Multimedia Broadcast Service (MBMS) in RAN; (Release 6)" 3GPP TS 25.cde V0.0.1; May 2002; pp. 7.
(Continued)

*Primary Examiner* — Ayaz Sheikh
*Assistant Examiner* — Faiyazkhan Ghafoerkhan
(74) *Attorney, Agent, or Firm* — The Farrell Law Firm, P.C.

(57) ABSTRACT

A method and apparatus are provided for providing a multimedia broadcast/multicast service (MBMS) to a user equipment (UE) by a base station in a mobile communication system. The method includes transmitting, to a terminal, a first message including first information about a schedul-
(Continued)

ing period and an offset; transmitting, to the terminal, control information notifying of a change of a second message; transmitting, to the terminal, the second message including second information about at least one multimedia broadcast/ multicast service (MBMS), based on the first information about the scheduling period and the offset; and transmitting, to the terminal, data of the at least one MBMS. The second information about the at least one MBMS includes an identification of the at least one MBMS.

12 Claims, 13 Drawing Sheets

Related U.S. Application Data continuation of application No. 12/204,308, filed on Sep. 4, 2008, now Pat. No. 8,774,075, which is a continuation of application No. 10/641,500, filed on Aug. 15, 2003, now Pat. No. 7,515,922.

(51) Int. Cl.
  H04H 20/57    (2008.01)
  H04W 4/06    (2009.01)
  H04W 72/00   (2009.01)
  H04W 68/00   (2009.01)

(52) U.S. Cl.
  CPC .......... H04W 72/005 (2013.01); H04W 68/00 (2013.01)

(56) References Cited

U.S. PATENT DOCUMENTS

| | | | | |
|---|---|---|---|---|
| 5,923,649 A * | 7/1999 | Raith | .................... | H04B 7/2643 370/328 |
| 6,157,815 A * | 12/2000 | Collins | ............. | H04W 52/0216 340/7.32 |
| 6,275,706 B1 * | 8/2001 | Rune | ........................ | H04W 8/26 455/443 |
| 6,421,540 B1 * | 7/2002 | Gilhousen | ............. | H04L 1/0002 455/458 |
| 6,480,476 B1 * | 11/2002 | Willars | ................. | H04B 1/1615 340/7.34 |
| 6,643,318 B1 * | 11/2003 | Parsa | .................... | H04B 1/7103 370/335 |
| 6,684,081 B2 * | 1/2004 | Sarkkinen | ........... | H04W 72/005 455/515 |
| 6,839,565 B2 * | 1/2005 | Sarkkinen | ............. | H04L 12/189 370/312 |
| 6,999,753 B2 * | 2/2006 | Beckmann | .......... | H04W 68/025 455/412.2 |
| 7,013,131 B2 * | 3/2006 | Lee | ........................ | H04M 1/576 379/142.06 |
| 7,177,658 B2 * | 2/2007 | Willenegger | ..... | H03M 13/2707 370/334 |
| 7,295,845 B2 * | 11/2007 | Larmala | ................ | H04W 76/10 455/453 |
| 7,383,432 B1 * | 6/2008 | Barnes | .................... | G06F 21/55 713/151 |
| 7,463,599 B2 * | 12/2008 | Lindoff | ................. | H04W 68/00 370/311 |
| 8,200,835 B2 * | 6/2012 | Beckmann | .......... | H04W 72/005 709/230 |
| 2002/0025811 A1 * | 2/2002 | Willey | .............. | H04W 52/0216 455/434 |
| 2002/0163894 A1 * | 11/2002 | Alapuranen | ......... | H04B 7/2628 370/335 |
| 2003/0093530 A1 * | 5/2003 | Syed | .................... | H04H 20/103 709/226 |
| 2003/0134653 A1 * | 7/2003 | Sarkkinen | ............. | H04W 76/12 455/517 |
| 2003/0157949 A1 | 8/2003 | Sarkkinen et al. | | |
| 2003/0207696 A1 | 11/2003 | Willenegger et al. | | |
| 2003/0211855 A1 | 11/2003 | Sarkkinen et al. | | |
| 2003/0211860 A1 * | 11/2003 | Sarkkinen | ........... | H04W 72/005 455/522 |
| 2003/0214937 A1 | 11/2003 | Lindoff et al. | | |
| 2004/0022218 A1 * | 2/2004 | Kim | .................... | H04L 12/1881 370/335 |
| 2004/0087320 A1 * | 5/2004 | Kim | ........................ | H04H 20/16 455/458 |
| 2004/0102200 A1 * | 5/2004 | Palkisto | ................ | H04W 68/12 455/466 |
| 2004/0105402 A1 * | 6/2004 | Yi | ........................ | H04B 7/2628 370/312 |
| 2004/0177154 A1 * | 9/2004 | Sarkkinen | ............. | H04L 12/185 709/236 |
| 2004/0227618 A1 * | 11/2004 | Hwang | ................. | H04L 12/189 340/7.46 |
| 2005/0036517 A1 | 2/2005 | Larmala et al. | | |
| 2005/0111393 A1 * | 5/2005 | Jeong | .................... | H04W 68/00 370/312 |
| 2005/0151840 A1 * | 7/2005 | Hurtta | ................. | H04L 12/1886 348/61 |

FOREIGN PATENT DOCUMENTS

| | | |
|---|---|---|
| EP | 1213939 | 6/2002 |
| GB | 2344202 | 5/2000 |
| JP | 2001308856 | 11/2001 |
| KR | 1020010097757 | 11/2001 |
| KR | 1020020079327 | 10/2002 |
| RU | 2 157 598 | 10/2000 |
| WO | WO 99/52312 | 10/1999 |
| WO | WO 00/52948 | 9/2000 |
| WO | WO 03088570 A1 * | 10/2003 |

OTHER PUBLICATIONS

3GPP TSG-RAN WG2 Meeting #27; Orlando, USA; Feb. 18-22, 2002; pp. 28.
3GPP TS 25.346 1.1.0: "Introduction of Multimedia Broadcast/ Multicast Service (MBMS) in the Radio Access Network (Stage-2)";TSG-RAN WG2 meeting #33 Sophia-Antipolis, France; Nov. 12-15, 2002; pp. 10.
3GPP TS 25.346 1.1.0: "Introduction of Multimedia BroadcastlMulticast Service (MBMS) in the Radio Access Network (Stage-2)"; 3GPP TSG RAN WG2/WG3 MBMS AdHoc; Workingham, UK; Jan. 15-16, 2003; pp. 11.
3GPP: "3rd Generation Partnership Project; Technical Specification Group Services and System Aspects; Multimedia Broadcast/Multicast Service; Architecture and Functional Description" Apr. 25, 2002.
"3rd Generation Partnership Project; Technical Specification Group Radio Access Network; Radio Interface for Broadcast/Multicast Services", Mar. 2001, pp. 1-31.
ETSI: "Digital Cellular Telecommunications System (Phase 2+) (GSM); Universal Mobile Telecommunications System (UMIS); General Packet Radio Service (GPRS) Service Description; Stage 2", Mar. 2002, pp. 1-204.
European Search Report dated Dec. 9, 2003 issued in a counterpart application, namely, Appln. No. 03018454.3.

* cited by examiner

Schedule Message (900)

Message Description Type = 9 (901)

| | Information Element | size(bit) |
|---|---|---|
| 902 | Message Type (2) | 8 |
| 903 | Offset to Begin CTCH BS index | 8 |
| 904 | Length of CBS Scheduling Period | 8 |
| 905 | New Message Bitmap | variable |
| 906 | Message Description for the first CTCH BS | variable |
| | ... | |
| 907 | Message Description for the last CTCH BS | variable |

FIG.9

MBMS STATUS CBS Message (1050)

| Information Element | size(bit) |
|---|---|
| 1051 — Message Type (4) | 8 |
| 1052 — Message ID | 16 |
| 1053 — Serial Number | 16 |
| 1054 — Data Coding Scheme | 8 |
| 1055 — MBMS STATUS DATA | 128 * n |
| 1056 — SERVICE ID 1 | |
| 1057 — SERVICE ID 2 | |
| ... | |
| 1058 — SERVICE ID n | |

FIG.10

METHOD OF TRANSMITTING/RECEIVING CONTROL MESSAGE IN A MOBILE COMMUNICATION SYSTEM PROVIDING MULTIMEDIA BROADCAST/MULTICAST SERVICE

PRIORITY

This application is a continuation of U.S. application Ser. No. 14/324,848, which was filed in the U.S. Patent and Trademark Office on Jul. 7, 2014, which is a continuation of U.S. application Ser. No. 12/204,308, issued as U.S. Pat. No. 8,774,075, which was filed in the U.S. Patent and Trademark Office on Sep. 4, 2008, which is a continuation of U.S. application Ser. No. 10/641,500, issued as U.S. Pat. No. 7,515,922, which was filed in the U.S. Patent and Trademark Office on Aug. 15, 2003, and claims priority under 35 U.S.C. § 119 to Korean Application Serial No. 10-2002-0048610, which was filed in the Korean Intellectual Property Office on Aug. 16, 2002, the entire content of each of which is incorporated herein by reference.

BACKGROUND OF THE INVENTION

1. Field of the Invention

The present invention relates generally to a control message transmitting/receiving method in a mobile communication system, and in particular, to a method of transmitting/receiving a control message between a radio network controller (RNC) and a user equipment (UE) in a mobile communication system providing multimedia broadcast/multicast service (MBMS).

2. Description of the Related Art

Owing to today's development in the telecommunications industry, CDMA (Code Division Multiple Access) mobile communication systems have evolved from voice service to multicast multimedia communications which enable transmission of a large volume of data such as packet data and circuit data. Hence broadcast/multicast service is being actively developed in which one data source serves a plurality of UEs to support the multicast multimedia communications. The broadcast/multicast service is categorized into cell broadcast service (CBS) being a message-centered service and MBMS supporting multimedia data such as real-time pictures and voice, still images, text, etc.

A network configuration for providing the MBMS in a mobile communication system will be described with reference to FIG. 1.

FIG. 1 is a schematic view illustrating the configuration of a network for providing an MBMS service in a mobile communication system.

Referring to FIG. 1, a multicast/broadcast-service center (MB-SC) 110 serves as an MBMS stream source. It schedules MBMS streams and transmits the streams to a transit network (NW) 120. The transit NW 120, located between the MB-SC 110 and an SGSN (Serving GPRS Support Node) 130, transfers the received MBMS streams to the SGSN 130. The SGSN 130 can be configured with a GGSN (Gateway GPRS Support Node) and an external network. It is assumed here that a plurality of UEs, UE 1 161, UE 2 162, UE 3 163 within Node B 1 (i.e. cell 1) 160, and UE 4 171 and UE 5 172 within Node B 2 (i.e. cell 2) 170 are to receive the MBMS service. The SGSN 130 controls MBMS-related services for the UEs, such as management of MBMS-related billing data and selective transmission of MSMS service data to a particular RNC 140. For simplicity, Node B is used herein to describe the cell itself. Obviously, a Node B manages one or more cells.

The SGSN 130 selectively transmits MBMS service data to the RNC 140 and the RNC 140 selectively transmits the MBMS service data to cells. For the selective transmission, the SGSN 130 must know which RNCs are to receive the MBMS service data, including RNC 140, as well as which cells are to receive the MBMS service data. Thus, the RNC 140 can provide the MBMS service to the cells. The RNC 140 controls a plurality of cells, transmits MBMS service data to cells having UEs requesting the MBMS service, controls radio channels established for providing the MBMS service, and manages MBMS-related information using MBMS streams received from the SGSN 130. As illustrated in FIG. 1, one radio channel is established for the MBMS service between a Node B and UEs within the coverage area of the Node B, for example, between cell 2 170 and UEs 171 and 172. An HLR (Home Location Register: not shown) is connected to the SGSN 130 and authenticates MBMS subscribers.

To provide a specific MBMS service, basic information about the MBMS service is provided to UEs. If the UEs want to receive the MBMS service, a list of the UEs is transmitted to a network. The network then pages the UEs and establishes radio bearers (RBs) for the MBMS service. Thus, the MBMS service is provided to the UEs through the RBs. If the MBMS service is terminated, the UEs are informed of the MBMS service termination and release all resources assigned for the MBMS service. This is a normal MBMS service procedure.

FIG. 2 is a diagram illustrating a signal flow for providing an MBMS service between a UE and a network in the mobile communication system Referring to FIG. 2, the UE subscribes to the MBMS service through a core network (CN) in step 201 (subscription). The CN includes an MB-SC, a transit NW, and an SGSN as illustrated in FIG. 1. The subscription is a process of exchanging basic information related to MBMS billing or MBMS reception between a service provider and a user. When the subscription is completed, the CN notifies UEs of current available MBMS services along with their basic information by, for example, menu information, in step 202 (announcement). The menu information contains the times and durations of the MBMS services. The CN broadcasts the menu information as a general announcement, for example, by CBS, or transmits it only to UEs requesting MBMS services. The CN also notifies the UEs of service IDs identifying the respective MBMS services by the menu information.

Upon receipt of the menu information in step 202, the UE selects an intended MBMS service from the menu information and transmits a service request message to the CN in step 203 (joining). The service request message includes the ID of the selected MBMS service and the ID of the UE. The CN then identifies the requested MBMS service and establishes a multicast mode bearer for the UE in step 204 (multicast mode bearer setup). During the multicast mode bearer setup, transport bearers can be set up beforehand over the CN, that is, between the SGSN and the transit NW. For example, a GTP-U/UDP/IP/L2/L1 bearer (refer to 3GPP TS 23.060) can be established ahead of time between the SGSN and a GGSN. The CN then notifies the UE that the requested MBMS service will start soon, through a paging type notification, in step 205 (notification). The paging can be carried out conventionally or in an optimized paging method for MBMS as disclosed in Korea Patent Application No.

2002-34704 filed by the same applicant. The UE is then actually assigned the radio resources necessary for the MBMS service in a radio resource allocation procedure with the CN, and implements the assigned radio resources in hardware in step 206 (radio resource allocation). The radio resource allocation occurs in two steps, a step for the RNC notifying UEs within an arbitrary cell of information about an RB established for the MBMS service in the cell (hereinafter, referred to as radio bearer setup), and a step for the RNC transmitting to cells having UEs requesting the MBMS service information about transport bearers and radio bears to be set up on Iub interfaces (hereinafter referred to as radio link setup). The RB setup will be described later with reference to FIG. 4. When the radio resource allocation is completed, all UEs that have requested the MBMS service are informed of the radio links on which the MBMS service is provided, and of higher layers in which the MBMS service is processed. The cells of the UEs completely establish the radio links and Iub interfaces. With the preparation for the MBMS service completed between the RNC and the UEs, the CN transmits MBMS service data to the UEs through the RNC in step 207 (data transfer). In step 208, the radio resources, that is, the transport bearers and radio bearers are released between the UEs and the CN when the MBMS data transmission is completed (radio resource release).

Steps 203 to 206 illustrated in FIG. 2 will be described in more detail with reference to FIG. 3. Although the CN generically refers to the SGSN 130, the transit NW 120, and the MB-SC 110, only the SGSN 130 will be considered below in connection with the operation of the RNC 140.

FIG. 3 is a diagram illustrating a detailed signal flow for steps 203 to 206 depicted in FIG. 2

Referring to FIG. 3, the UE 161, after receiving basic information about a specific MBMS service, in step 202, transmits an ACTIVATE MBMS PDP (Packet Data Protocol) CONTEXT REQUEST message to the SGSN 130 in a CELL_FACH state in step 301. Here, a PDP context includes a primary PDP context and a secondary PDP context. The second PDP context exists only if the primary PDP context exists. It has the same information as the primary PDP context, but utilizes a different GPRS (General Packet Radio Service) GTP (GPRS Tunneling Protocol) tunnel. The GPRS is a packet data service deployed in a UMTS network. The ACTIVATE MBMS PDP CONTEXT REQUEST message includes the parameters of NSAPI (Network layer Service Access Point Identifier), TI, PDP type, PDP address, access point network, and QoS (Quality of Service). The mobile communication system creates a GTP tunnel to the SGSN 130 in the case where the UE 161 requests it (i.e. UE-initiated activate), or it to the CN in the case where an external network requests (i.e. network-requested activate).

Upon receipt of the ACTIVATE MBMS PDP CONTEXT REQUEST message, the SGSN 130 creates an MBMS PDP context for the MBMS service if the UE 161 is the first one to request the MBMS service, stores information about the UE 161 in the MBMS PDP context, and performs a predetermined operation in conjunction with a GGSN connected to the SGSN 130. This operation is about GTP tunneling. When the SGSN 130 notifies the GGSN of the parameters set in the ACTIVATE MBMS PDP CONTEXT REQUEST message, the GGSN sets up a GTP tunnel based on the parameters. The MBMS PDP context is a set of variables containing information about the MBMS service. It includes a list of UEs that have transmitted the ACTIVATE MBMS PDP CONTEXT REQUEST message, the locations of the UEs, and transport bearers by which the MBMS service data is transmitted. The SGSN 130 then transmits to the UE 161 an ACTIVATE MBMS PDP CONTEXT REQUEST ACCEPT message in step 302. This message contains TMGI (Temporary Multicast Group Identity) for group paging in connection with the MBMS service, and DRX (Discontinuous Reception). The DRX is related to a cycle in which the UE 161 monitors a PICH (Paging Indicator Channel). The DRX contains a DRX CL (Cycle Length) coefficient and an Np. The Np represents the number of paging instances (PIs) in one system frame and is given as system information (SI). Its value is one of [18, 36, 72, 144]. The uses of the TMGI and DRX are disclosed in Korea Patent Application No. 2002-34704 filed by the same applicant. Upon receipt of the ACTIVATE MBMS PDP CONTEXT ACCEPT message, the UE 161 transitions to an idle state. Meanwhile, the SGSN 130 transmits a NOTIFICATION message to the RNC 140 to which the UE 161 belongs when the MBMS service is about to start or when the SGSN 130 receives first MBMS service data from the MB-SC 110, in step 303. Since the SGSN 130 stores a list of UEs requesting the MBMS service, and the RNCs to which they belong, the SGSN 130 transmits the NOTIFICATION message to the RNCs when the MBMS service is initiated. The NOTIFICATION message contains the TMGI and DRX.

Upon receipt of the NOTIFICATION message, the RNC 140 performs step 304. Specifically, the RNC 140 calculates a paging occasion (PO) and a PI using the TMGI and DRX. In the same manner, the UE 161 calculates the PO and PI using the TMGI and DRX contained in the ACTIVATE MBMS PDP CONTEXT REQUEST ACCEPT message. The RNC 140 informs the UE 161 of whether it will receive a PCH (Paging Channel) by setting the PICH to on or off state at a time point indicated by the PI and PO. If the PICH is on in the PI of the PO, the UE 161 receives the PCH signal and recognizes that it is paged. On the contrary, if the PICH is off, the UE 161 does not receive the PCH. Meanwhile, if the UE 161 is paged, the RNC 140 transmits to the UE 161 the NOTIFICATION message or a paging message on a PCH associated with the PICH a predetermined time after the transmission of the PICH, so that the UE 161 can be informed that the MBS service will start soon or it will receive the NOTIFICATION message or the paging message. The NOTIFICATION message is a type of paging message, containing information about message type, paging cause, and TMGI. The paging cause indicates the reason for the paging. In the current W-CDMA mobile communication system, "terminating streaming call" is defined as a paging cause for MBMS. Aside from the existing paging cause, a novel paging cause can be defined for MBMS. For simplicity, the NOTIFICATION message or paging message will be hereinafter referred to as "an MBMS paging message."

In the mean time, the UE 161 monitors the PICH at the PI of the PO. It receives an MBMS paging message on an associated PCH if the PICH is on, and does not receive it if the PICH is off. When '1' is coded in the PI of the PO, it means that the PICH is on. On the other hand, when '0' is coded in the PI of the PO, it means that the PICH is off. Upon receipt of the MBMS paging message, the UE 161 determines which MBMS service will be initiated based on the TMGI contained in the MBMS paging message. If the TMGI indicates the MBMS service that the UE 161 has requested, the UE 161 awaits for receipt of corresponding MBMS service data.

After receiving the MBMS paging message, the UE 161 transitions to the CELL_FACH state and transmits to the SGSN 130 a NOTIFICATION RESPONSE message indicating normal reception of the NOTIFICATION message in step 305. The SGSN 130 transmits to the RNC 140 an MBMS RAB (Radio Access Bearer) ASSIGNMENT REQUEST message in step 306. The MBMS RAB ASSIGNMENT REQUEST message may contain QoS and a list of UEs for which an MBMS RAB is to be set. While the description centers on the UE 161, if a plurality of UEs request the MBMS service, the MBMS RAB ASSIGNMENT REQUEST message, including a list of the UEs, is delivered to the RNC 140. The RNC 140 then performs a preset operation required to provide the MBMS service to the UEs. RAB is a set of transmission resources configured in an RNC to provide the MBMS service. Specifically, the RAB includes a transport bearer on the Iub interface between the SGSN 130 and the RNC 140, a transport bearer on the Iub interface between the RNC 140 and the Node B 160, and radio channels.

The RNC 140 determines MBMS RB information (MBMS RB info) about the MBMS service in relation to the MBMS RAB ASSIGNMENT REQUEST message. The MBMS RB info covers layer 2 (L2) information and layer 1 (L1) information. The L2 information can be RLC (Radio Link Control)/PDCP (Packet Data Convergence Protocol)-related information. The L1 information may include information about TFS (Transport Format Set), TFCS (Transport Format Combination Set), channelization code, and transmit power. The RNC 140 determines cells for which the MBMS RAB is established according to the list of UEs. Since it perceives the locations of UEs in the CEL_FACH state by cells, the RNC 140 can translate the UE list into a list of cells. Thus, the RNC 140 transmits the MBMS RB SETUP message to the individual cells as many times as the number of the cells.

In step 307, the RNC 140 transmits to the UE 161 the MBMS RB SETUP message. The UE 161 then sets up an MBMS RB according to the MB RB info and transmits an MBMS RB SETUP COMPLETE message to the RNC 140 in step 308. The RNC 140 transmits an MBMS RAB ASSIGNMENT RESPONSE message to the SGSN 130 in step 309. The SGSN 130 then starts to transmit MBMS service data to the UE 161 in step 207.

The messages NOTIFICATION and MBMS RB SETUP illustrated in FIG. 3 are group messages. A group message is defined as a message transmitted commonly to a plurality of UEs. That is, the UEs decide whether they are to receive the NOTIFICATION message on the PICH, referring to the same PI of the same PO in step 304. Since the TMGI indicates the UEs to receive the NOTIFICATION message, they can receive this message. Also, the MBMS RB SETUP message with the TMGI inserted therein is transmitted commonly to the UEs on an FACH (Forward Access Channel).

FIG. 4 illustrates steps 307 and 308 depicted in FIG. 3 in more detail before describing FIG. 4, it is to be appreciated that the RNC 140 manages cells 160 and 170 and it is assumed that n UEs including the UEs 161 and 162 within cell 160 request the same MBMS service. It is also to be noted that like reference numerals denote the same steps shown in FIG. 3.

Referring to FIG. 4, the RNC 140 receives the MBMS RAB ASSIGNMENT REQUEST message from the SGSN 130 in step 306. The RNC 140 then broadcasts the MBMS RB SETUP message to the n UEs in step 401. The MBMS RB SETUP message contains the MBMS RB info and an RRC state indicator. The RRC state indicator is set to indicate transition to a CELL_PCH state in the case of complete transmission of control messages between the RNC 140 and the n UEs (RRC state indicator=CELL_PCH). The MBMS RB SETUP message is transmitted to cells on an FACH and thus the UEs in the CELL_FACH can receive the MBMS RB SETUP message. Hence, the MBMS RB SETUP message functions to provide common MBMS RB info within one cell. Therefore, common transmission of the MBMS RB SETUP message to the UEs by their cell is preferred to transmission of the MBMS RB SETUP message to the individual UEs. Therefore, the use of a broadcasting channel defined as the FACH enables broadcasting of the MBMS RB SETUP message.

Each of the n UEs transmits the MBMS RB SETUP COMPLETE message to the RNC 140 and transitions to the CELL_PCH state because RRC state indicator=CELL_PCH in steps 402-1 to 402-*n*.

Meanwhile, the RNC 140 transmits to the SGSN 130 the MBMS RAB ASSIGNMENT RESPONSE message in response to the MBMS RAB ASSIGNMENT REQUEST message in step 309.

In the above procedure, each of the UEs can transmit the MBMS RB SETUP COMPLETE message on an RACH (Random Access Channel). However, due to the limited capacity of the RACH, if a plurality of UEs attempt to transmit the MBMS RB SETUP COMPLETE message at the same time, system performance may be severely degraded. As illustrated in FIG. 4, since the UEs each transmit the MBMS RB SETUP COMPLETE message when step 401 is almost completed, it can be said that the UEs transmit the MBMS RB SETUP COMPLETE message simultaneously. The resulting congestion of the MBMS RB SETUP COMPLETE message traffic leads to degraded system performance.

SUMMARY OF THE INVENTION

Accordingly, the present invention is designed to address at least the problems and/or disadvantages described above and to provide at least the advantages described below.

It is, therefore, an aspect of the present invention to provide a method of transmitting/receiving a control message without affecting system performance in an MBMS-providing mobile communication system.

It is another aspect of the present invention to provide a method of transmitting/receiving a control message without message congestion in an MBMS-providing mobile communication system.

It is a further aspect of the present invention to provide a method of transmitting/receiving a control message so that an MBMS service procedure can be performed with no response messages being transmitted for a group control message in an MBMS-providing mobile communication system.

It is still another aspect of the present invention to provide a method of transmitting/receiving a control message, in which MBMS RB information is transmitted periodically to allow a UE failing to receive an MBMS RB SETUP message to receive an intended MBMS service according to the MBMS RB information in an MBMS-providing mobile communication system.

It is yet another aspect of the present invention to provide a method of transmitting/receiving a control message, in which MBMS RB information about ongoing MBMS services provided on a cell basis is transmitted periodically to allow a UE failing to receive an MBMS RB SETUP message to request MBMS RB information about an intended ongoing MBMS service in an MBMS-providing mobile communication system.

In accordance with an aspect of the present invention, a method is provided for a base station in a wireless communication system. The method includes transmitting, to a terminal, a first message including first information about a scheduling period and an offset; transmitting, to the terminal, control information notifying of a change of a second message; transmitting, to the terminal, the second message including second information about at least one multimedia broadcast/multicast service (MBMS), based on the first information about the scheduling period and the offset; and transmitting, to the terminal, data of the at least one MBMS. The second information about the at least one MBMS includes an identification of the at least one MBMS.

In accordance with another aspect of the present invention, a method is provided for a terminal in a wireless communication system. The method includes receiving, from a base station, a first message including first information about a scheduling period and an offset; receiving, from the base station, a second message including second information about at least one multimedia broadcast/multicast service (MBMS), based on the first information about the scheduling period and the offset, if the terminal receives control information notifying of a change of the second message; and receiving, from the base station, data of the at least one MBMS. The second information about the at least one MBMS includes an identification of the at least one MBMS.

In accordance with another aspect of the present invention, an apparatus is provided for a base station in a wireless communication system. The apparatus includes a transceiver unit configured to transmit, to a terminal, a first message including first information about a scheduling period and an offset, to transmit, to the terminal, control information notifying of a change of a second message, to transmit, to the terminal, the second message including second information about at least one multimedia broadcast/multicast service (MBMS), based on the first information about the scheduling period and the offset, and to transmit, to the terminal, data of the at least one MBMS; and a control unit configured to control the transceiver unit. The second information about the at least one MBMS comprises an identification of the at least one MBMS.

In accordance with another aspect of the present invention, an apparatus is provided for a terminal in a wireless communication system. The apparatus includes a transceiver unit configured to receive, from a base station, a first message including first information about a scheduling period and an offset, to receive, from the base station, a second message including second information about at least one multimedia broadcast/multicast service (MBMS), based on the first information about the scheduling period and the offset, if control information notifying of a change of the second message is received, and to receive, form the base station, data of the at least one MBMS. The second information about the at least one MBMS comprises an identification of the at least one MBMS.

BRIEF DESCRIPTION OF THE DRAWINGS

The above and other aspects, features, and advantages of the present invention will become more apparent from the following detailed description when taken in conjunction with the accompanying drawings in which:

FIG. 9 illustrates the structure of a schedule message required for implementation of the second embodiment of the present invention;

FIG. 10 illustrates the structure of an MBMS Status CBS message required for implementation of the second embodiment of the present invention;

DETAILED DESCRIPTION OF EMBODIMENTS OF THE INVENTION

Figure 1:
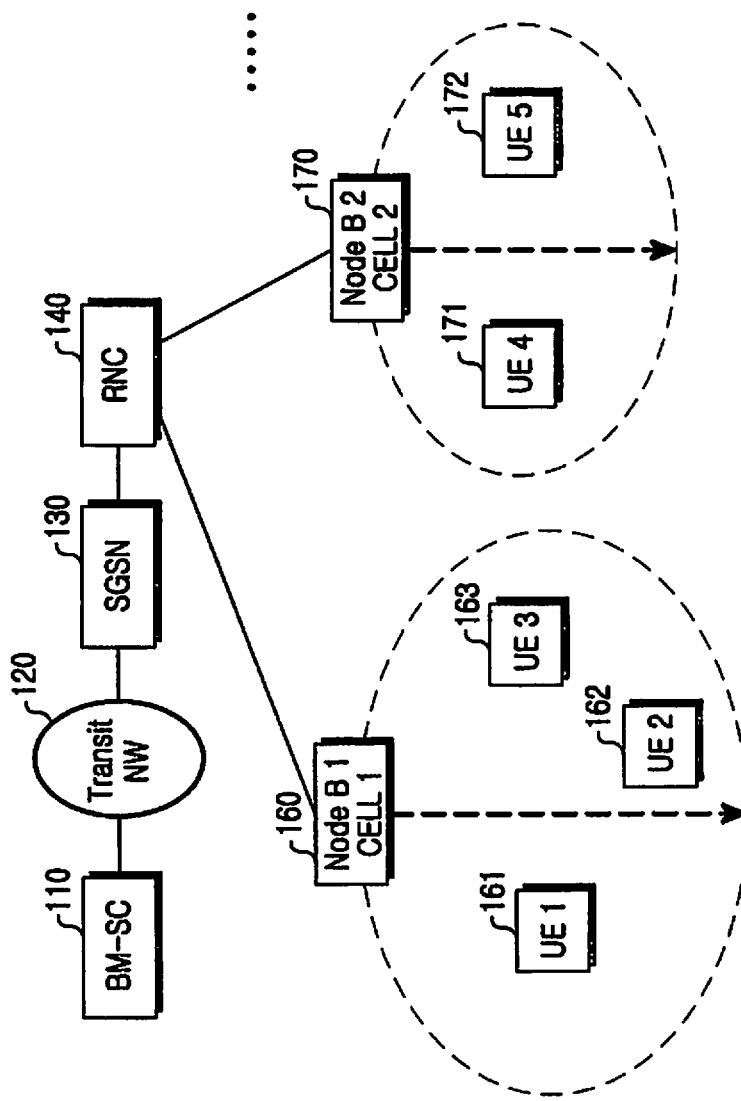
FIG. 1 is a schematic view illustrating the configuration of a network for providing MBMS in a mobile communication system.
Figure 2:
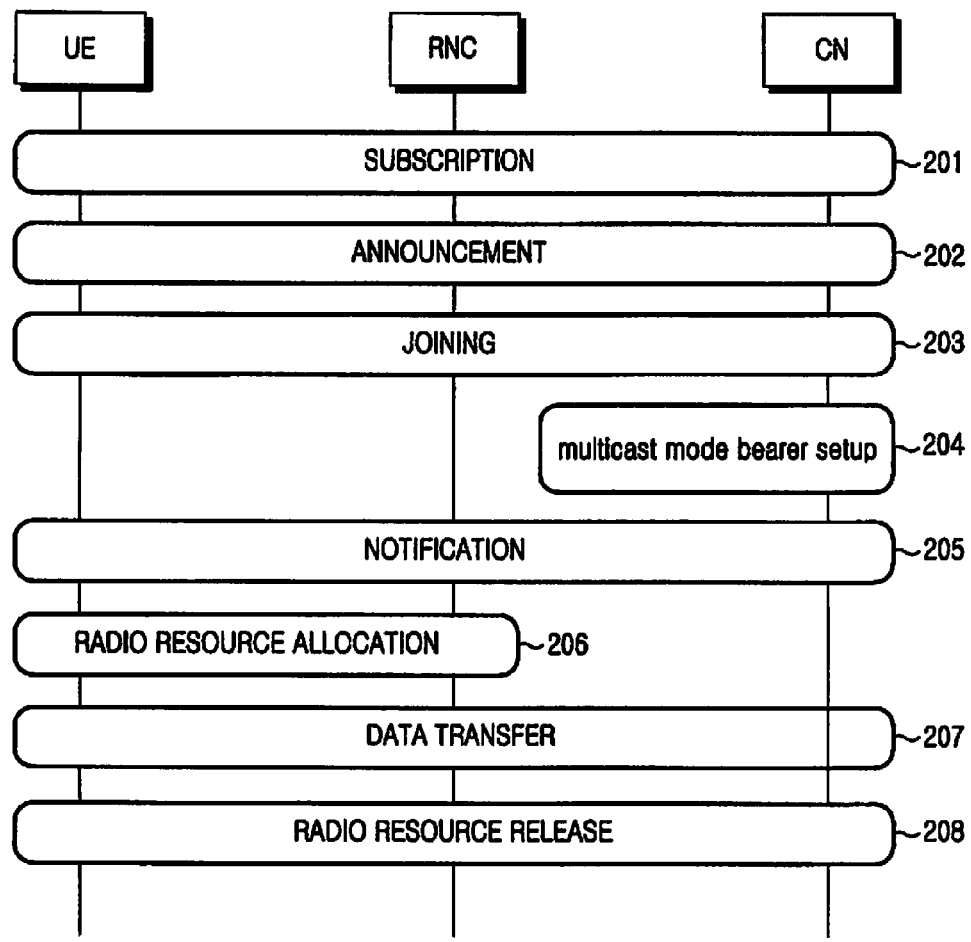
FIG. 2 is a diagram illustrating a signal flow for providing an MBMS service in the mobile communication system.
Figure 3:
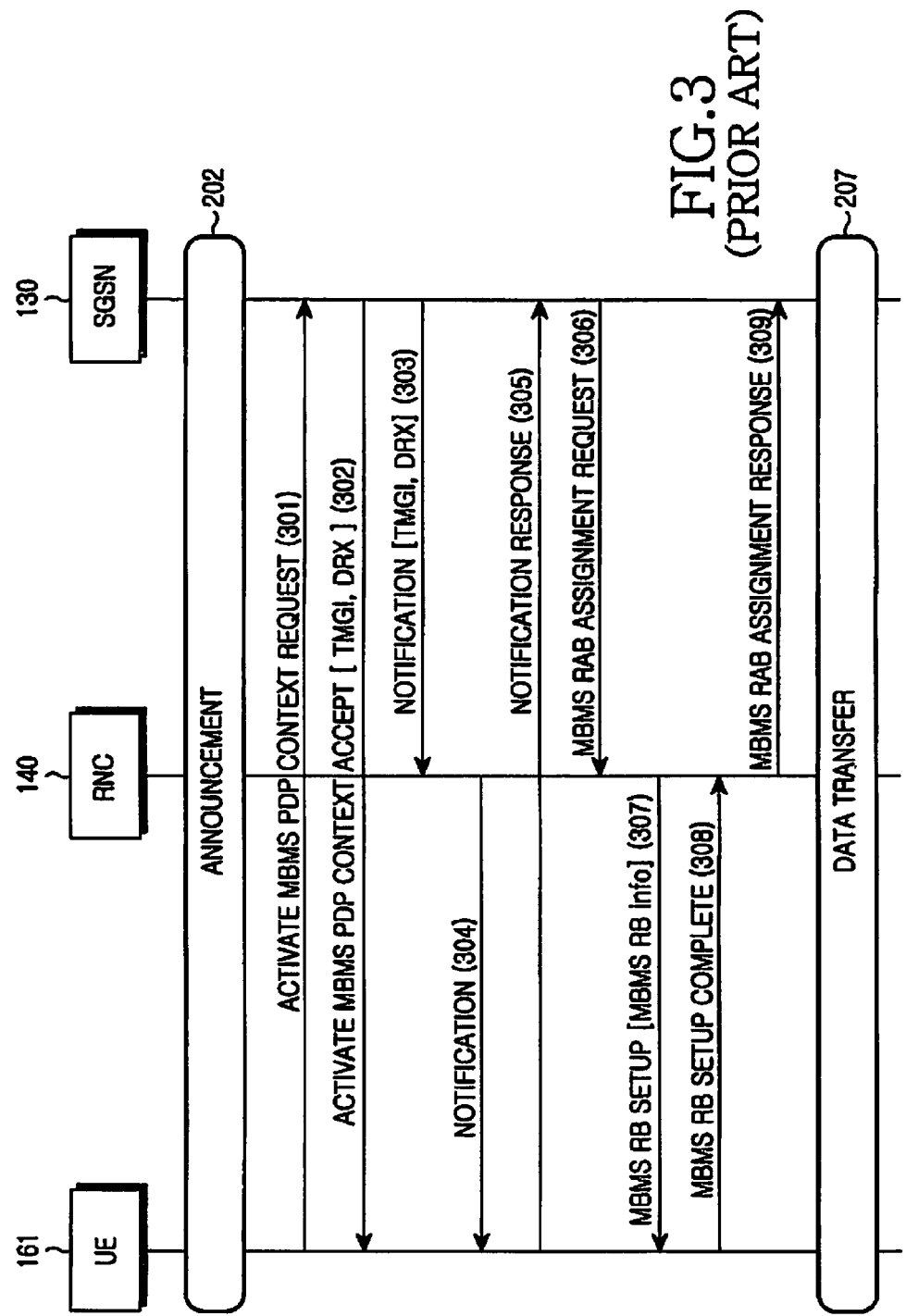
FIG. 3 is a diagram illustrating a detailed signal flow for steps 203 to 206 depicted in FIG. 2.
Figure 4:
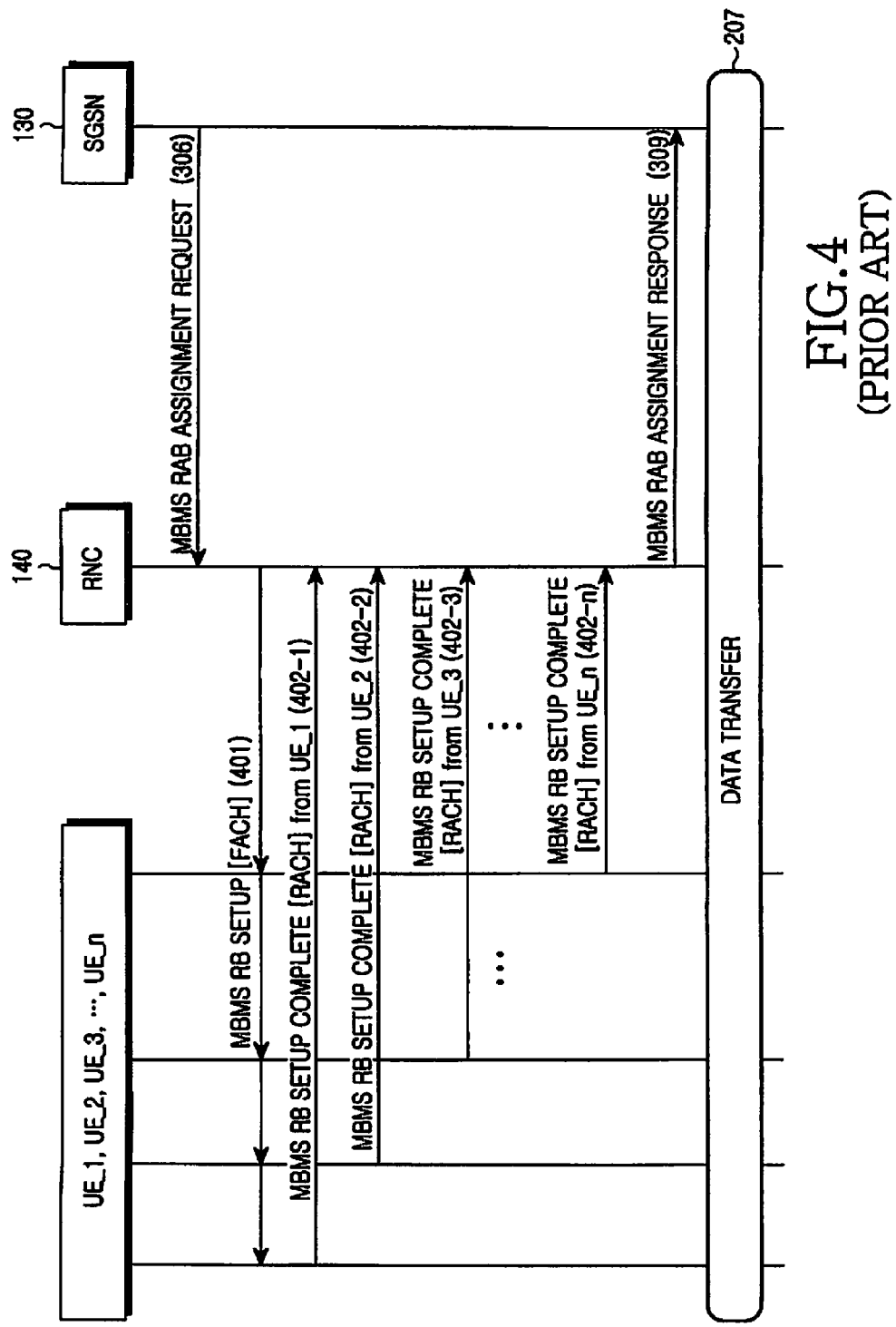
FIG. 4 is a diagram illustrating a detailed signal flow for steps 307 and 308 depicted in FIG. 3.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The present invention provides methods of allowing UEs that have received a group control message (e.g. MBMS RB SETUP) required for providing an MBMS service not to transmit a response message (e.g. MBMS RB SETUP COMPLETE) for the received message, solving problems arising from the non-receipt of the response message. These methods aim to prevent system performance degradation which may occur when a plurality of UEs simultaneously transmit a response message for a group control message, as described before. In fact, congestion resulting from the concurrent transmission of the response message makes it difficult to assess the states of the UEs to receive the MBMS service. Moreover, if UEs receiving the MBMS service cannot be discriminated from UEs failing to receive the MBMS service, serious problems can be generated when billing is performed at the same time as the initiation of the MBMS service. Hence, the present invention seeks to combat the problems arising from response message congestion from a plurality of UEs.

A group message is defined as a single RRC message that a network transmits commonly to a plurality of UEs. An RNC provides MBMS RB information (MBMS RB info) to UEs that request receipt of a particular MBMS service by a group message, MBMS RB SETUP. Another example of a group message is MBMS RB SETUP COMPLETE. This message is used by the RNC to confirm that the UEs have normally received the MBMS RB info. In general, if a UE does not transmit the response message, the RNC takes a necessary measure such as retransmission of the MBMS RB SETUP COMPLETE message to the UE, considering that the UE failed to receive the MBMS RB info. However, in accordance with an embodiment of the present invention, the MBMS RB info is transmitted periodically so that UEs, though they have failed to receive the MBMS RB SETUP message, can receive the MBMS RB info. In accordance with another embodiment of the present invention, the RNC transmits information about ongoing MBMS services provided on a cell basis to the UEs of a specific cell, so that the UEs, though they fail to receive MBMS RB SETUP messages, can request MBMS RB info about their intended MBMS services currently in progress to the RNC.

The embodiments of the present invention will be described in the context of the MBMS. Yet, the MBMS is used in a broad sense that covers all packet data services. Therefore, the embodiments of the present invention are applicable to packet data services other than the MBMS in its narrow sense.

1. First Embodiment

An RNC periodically provides MBMS RB info about ongoing MBMS services, so that a UE can receive intended MBMS RB info a later time even though it fails to receive the MBMS RB info at an initial transmission.

1.1 Signaling

Figure 5:
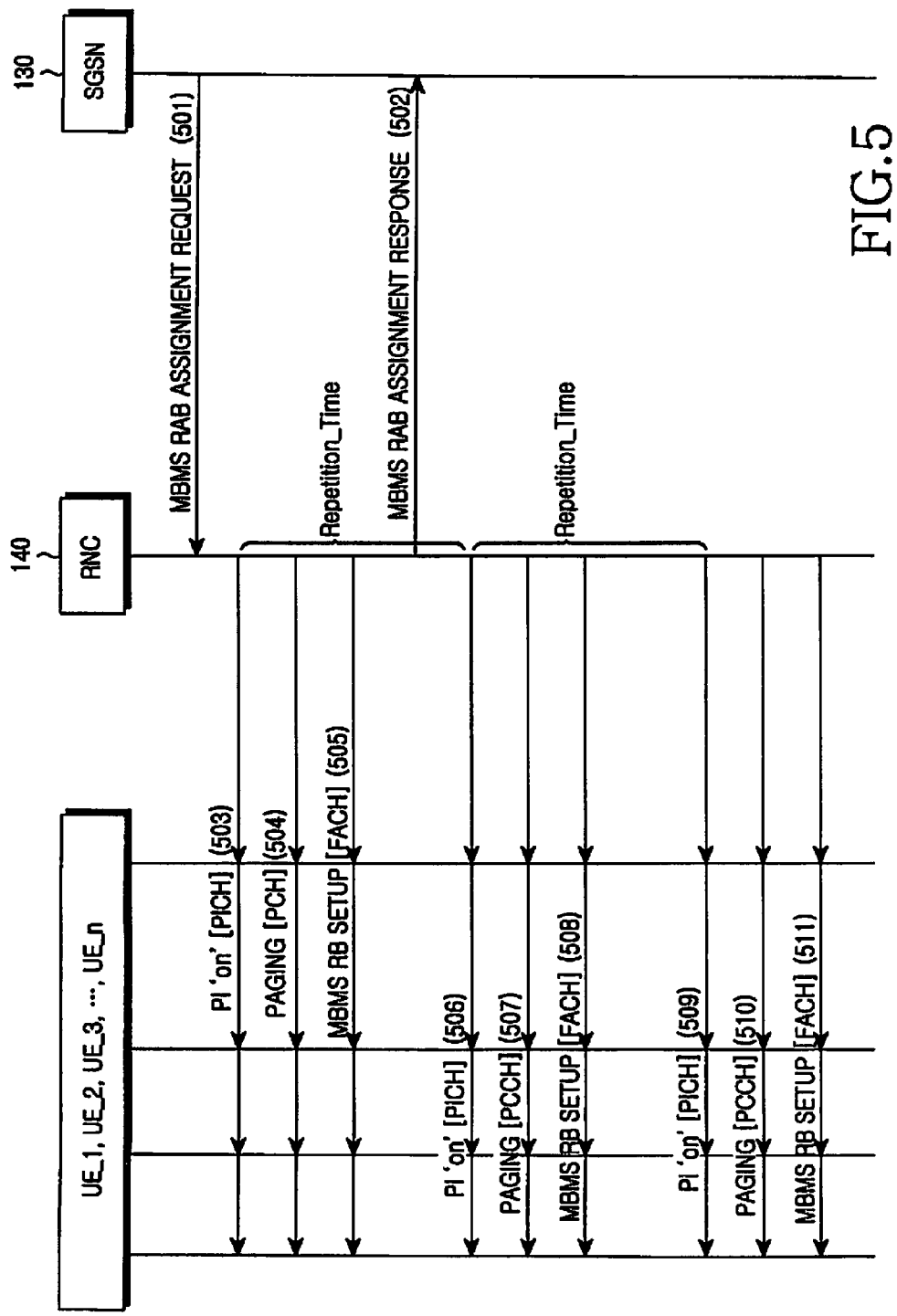
FIG. 5 is a diagram illustrating a signal flow for an RB setup procedure to provide an MBMS service according to an embodiment of the present invention.

FIG. 5 is a diagram illustrating a signal flow for an MBMS RB setup procedure according to the first embodiment of the present invention. In FIG. 5, all messages directed from the RNC 140 to the UEs are delivered by group signaling. Group signaling refers to a signal transmission scheme in which the RNC 140 transmits information commonly to a plurality of UEs or cells by a single message, as described before.

Referring to FIG. 5, the RNC 140 receives an MBMS RAB ASSIGNMENT REQUEST message from the SGSN 130 in step 501. The MBMS RAB ASSIGNMENT REQUEST message contains repetition time (R_T) in addition to TMGI, DRX, QoS, and a list of UEs for a particular MBMS service. The RNC 140 then calculates a PO and PI from the TMGI and DRX, determines cells for which MBMS RBs are to be established according to the UE list, and determines MBMS RB parameters according to the QoS. In other words, the RNC 140 determines cells for receiving the MBMS service according to the locations of the UEs requesting the MBMS service and determines MBMS RB info correspondingly. In steps 503, 504 and 505, the RNC 140 transmits the MBMS RB info to the UEs.

The RNC 140 sets a PICH to on or off at a time indicated by the PI and PO in order to indicate whether the UEs are to receive a PCH, that is, a paging message. After transmitting the PICH, the RNC 140 activates a repetition timer to check repetition time set in the MBMS RAB ASSIGNMENT REQUEST message. The timer activation can occur before or after the PICH transmission.

The UEs also calculate the PO and PI from TMGI and DRX set in an ACTIVATE MBMS PDP CONTEXT ACCEPT message. In step 503, the UEs receive the PICH and checks whether the PICH is on or off at a time point indicated by the PI of the PO. The UEs determine whether they will receive a paging message on the PCH according to the check result. That is, if the PICH is on in the PI of the PO, a UE corresponding to the PI of the PO recognizes that it will receive a paging message. On the contrary, a UE corresponding to an off-PI of a PO does not receive the PCH.

Meanwhile, if particular UEs are to be paged, the RNC 140 transmits to the UEs a paging message on an associated PCH a predetermined time after the transmission of the PICH, to notify the UEs that they will receive the MBMS service soon in step 504. The paging message contains a group ID such as TMGI or service ID, instead of the IDs of the UEs.

Knowing that they will receive the paging message, the UEs receive it in step 504. They determine whether they are paged for a particular MBMS service. If the TMGI or service ID is identical to the ID of an intended MBMS service, the UEs transition to the CELL_FACH state to receive MBMS service data on the FACH.

In step 505, the RNC 140 transmits an MBMS RB SETUP message to the UEs on the FACH. Here, the determined MBMS RB parameters are inserted into the MBMS RB SETUP message. The UEs then establish RBs required for the MBMS service. Specifically, the UEs establish L2/L1 according to MBMS RB info included in the MBMS RB SETUP message and receive MBMS service data later via the MBMS RBs.

It may occur that some of the UEs fail to receive the MBMS RB SETUP message on the FACH. The cause is a failure in recognizing that the PI is on, or a bad radio link condition. The UEs transmit no messages indicating the reception failure. Yet, they await receipt of the MBMS RB SETUP message, continuously monitoring the PI of the PO on the PICH which is retransmitted periodically. Though later, they can receive the MBMS service.

The RNC 140 can transmit an MBMS RAB ASSIGNMENT RESPONSE message to the SGSN 130 during steps 503, 504, and 505, or after transmitting the MBMS RB SETUP message on the FACH. The MBMS RAB ASSIGNMENT RESPONSE message notifies the SGSN 130 of the successful setup of a requested MBMS RAB. In the present invention, since the UEs transmit no response messages for the MBMS RB SETUP message, the RNC 140 cannot determine whether the MBMS RAB has been successfully established. Yet, the RNC 140 considers the MBMS RAB successful when it completely transmits the MBMS RB SETUP message, and transmits the MBMS RAB ASSIGNMENT RESPONSE message to the SGSN 130 in step 502.

The RNC 140 then checks the repetition timer to determine whether the repetition time has elapsed. The time expiration is declared when the repetition timer is zero. Upon the time expiration, the RNC 140 reactivates the repetition timer and retransmits the FACH to deliver the PICH, PCH, and MBMS RB SETUP message in steps 506, 507 and 508 in the same manner as steps 503, 504 and 505. In relation to steps 506, 507 and 508, the UEs operate in the same manner as described above. Upon each expiration of the timer, the RNC 140 reactivates the timer and retransmits the FACH, as shown again in steps 509, 510 and 511.

1.2 UE Operation

Figure 6:
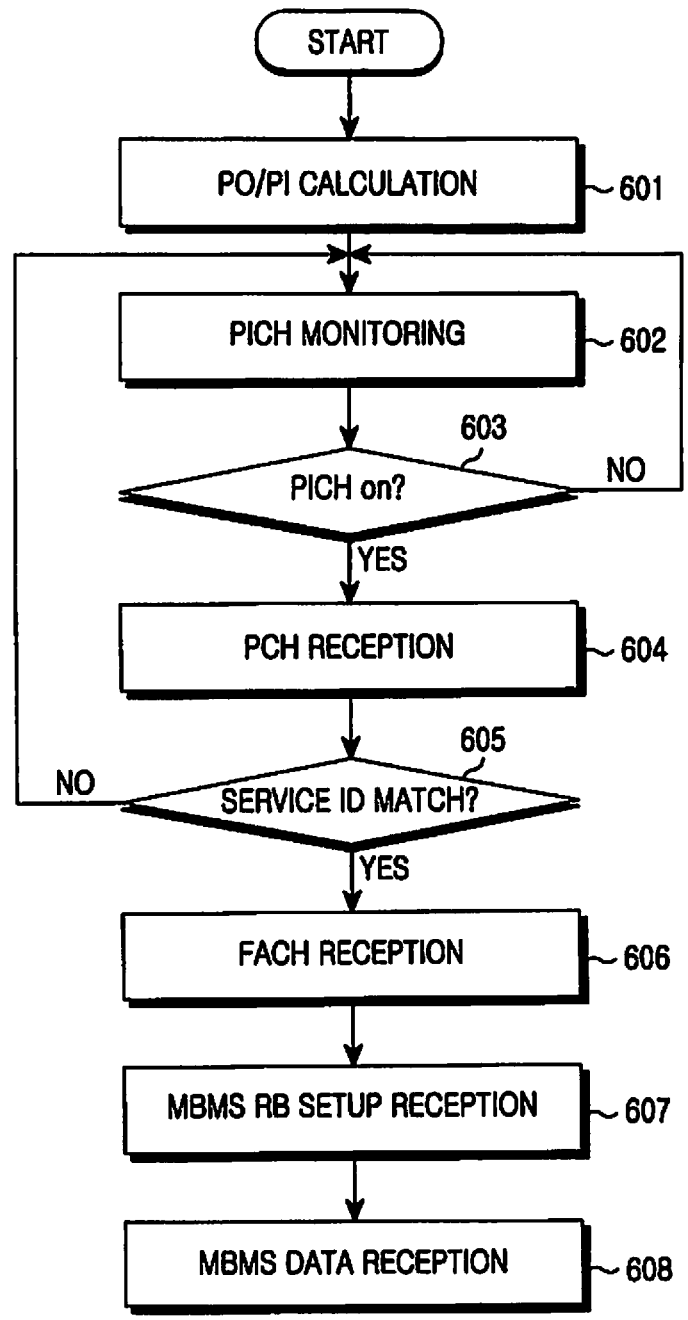
FIG. 6 is a flowchart illustrating the control operation of a UE according to the embodiment of the present invention.

FIG. 6 is a flowchart illustrating the control operation of a UE according to the first embodiment of the present invention. It is assumed that the UE has requested a particular MBMS service.

Before describing FIG. 6, state transitions for the UE will first be described. CELL_PCH is a state where the UE sets up only a PICH with no dedicated channels set up and receives a PICH signal. If the PICH signal indicates that the UE will receive a paging message on a PCH in the CELL_PCH state, the UE receives the PCH signal. CELL_FACH is a state where the UE sets up an FACH with no dedicated channels established, receives control messages on the FACH, and operates correspondingly. Upon receipt of the PCH in the CELL_PCH state, the UE transitions to the CELL_FACH state.

Referring to FIG. 6, after receiving a TMGI and a DRX by the ACTIVATE MBMS PDP CONTEXT ACCEPT message, the UE calculates a PO and a PI using the TMGI and DRX in step 601. The UE then continuously monitors the PI within the PO on a PICH received from the RNC 140 in step 602 and determines whether the PI is on in step 603. If the PI is off, the UE returns to step 602. On the contrary, if the PI is on, the UE goes to step 604.

In step 604, the UE receives an associated PCH from the RNC 140. The PCH is transmitted from the RNC 140 a predetermined time after the transmission of the PI set to "on". The UE then determines whether a TMGI or service ID set in the paging message matches to a TMGI or service ID indicating an intended MBMS service in step 605. If they are different, the UE continuously monitors the PICH which is retransmitted from the RNC 140 periodically. If they are identical, the UE goes to step 606.

In step 606, the UE transitions to the CELL_FACH state and receives data on an FACH from the RNC 140. The UE then establishes L2 and L1 according to MBMS RB info included in an MBMS RB SETUP message received on the FACH in step 607 and receives MBMS service data via the MBMS RB from the RNC 140 in step 608.

Although FIG. 6 does not depict the operation of the UE in the case of failed reception of the MBMS RB SETUP message on the FACH, in that case, the UE returns to step 603. After receiving the retransmitted PICH from the RNC 140, the UE repeats the above procedure.

1.3 RNC Operation

Figure 7:
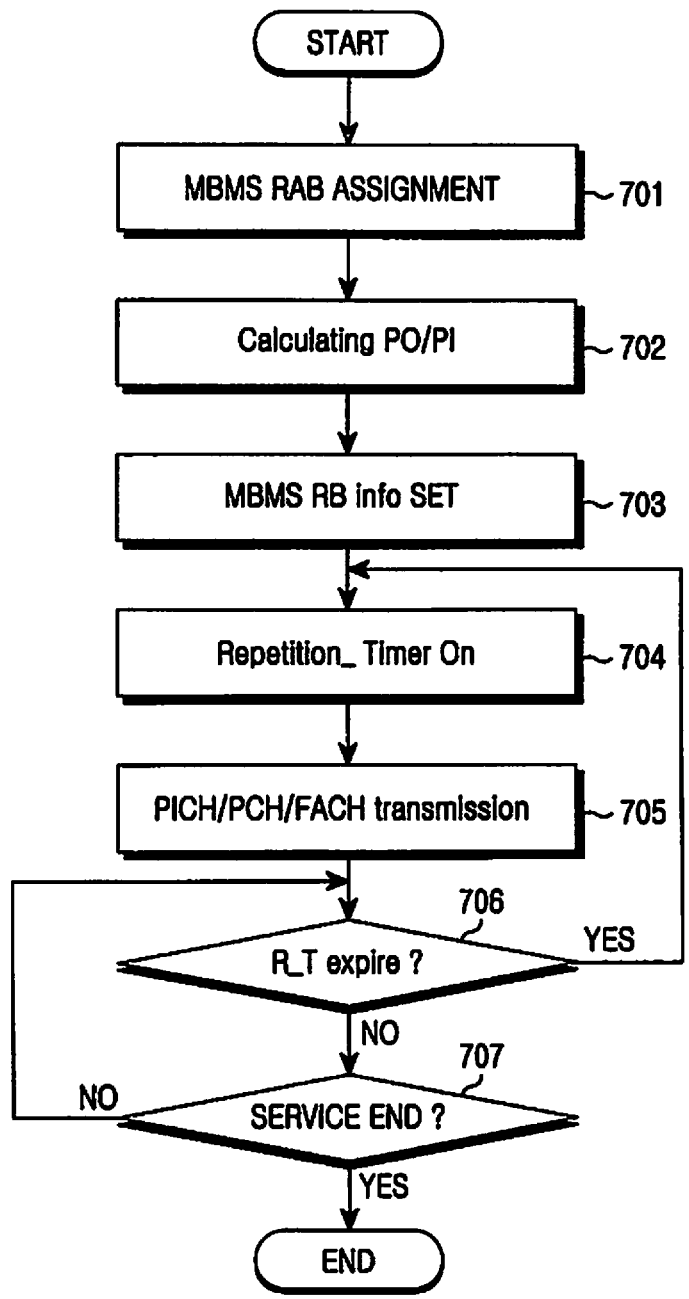
FIG. 7 is a flowchart illustrating the control operation of an RNC according to the embodiment of the present invention.

FIG. 7 is a flowchart illustrating the control operation of the RNC 140 according to the first embodiment of the present invention.

Referring to FIG. 7, upon receipt of the MBMS RAB ASSIGNMENT REQUEST message in step 701, the RNC 140 calculates a PO and a PI using a TMGI and a DRX set in the received message in step 702. In step 703, the RNC 140 determines cells for which MBMS RBs are to be established according to QoS and a UE list included in the message and sets MBMS RB info for the individual cells.

The RNC 140 activates a repetition timer to check a repetition time set in the MBMS RAB ASSIGNMENT REQUEST message by the SGSN 130 in step 704. The repetition time is checked to periodically carry out group signaling for MBMS RB setup, instead of receiving a response message from UEs.

In step 705, the RNC 140 performs a series of operations to transmit a PICH, a PCH, and an MBMS RB SETUP message on an FACH. The PICH is set to "on" in the PI of the PO, and a paging message including the TMGI is delivered on the PCH. The MBMS RB SETUP message on the FACH includes the determined MBMS RB info.

In step 706, the RNC 140 checks whether the retransmission time has elapsed. This implies that the repetition timer is zero. Or the repetition timer can be set to indicate a predetermined value upon time expiration. Upon the time expiration, the RNC 140 returns to step 704 for reactivation of the repetition timer and proceeds to step 705 for retransmission of the PICH, PCH and MBMS RB SETUP message. The SGSN 130 determines the repetition according to the type of the MBMS service. Since the repetition time is variable depending on situations, it is not explicitly set in the present invention. Nevertheless, the repetition time must be longer than the time between the transmission of the PICH and the transmission of the FACH for the MBMS RB SETUP message, and shorter than the duration of the MBMS service. While not shown in FIG. 7, the RNC 140 transmits MBMS service data to UEs with MBMS RBs successfully established, retransmitting the PICH, PCH and FACH. Meanwhile, the RNC 140 continuously determines whether the MBMS service is terminated in step 707. If the MBMS service is terminated, retransmission in steps 704, 705 and 706 is not needed.

As described above, the PICH, PCH and FACH are transmitted periodically according to a predetermined repetition time in steps 704 to 707 in accordance with the first embodiment of the present invention.

2. Second Embodiment

The RNC 140 periodically transmits to the UEs of a cell by the CBS information indicating whether their requested individual MBMS services are in progress or not. If a UE finds in the information an ongoing MBMS service which it has requested but fails to receive, it individually requests MBMS RB info about the MBMS service from the RNC 140. Hence, MBMS services can be provided without the need for transmitting a response message for an MBMS RB SETUP message from UEs requesting the MBMS services.

2.1 Signaling

Figure 8:
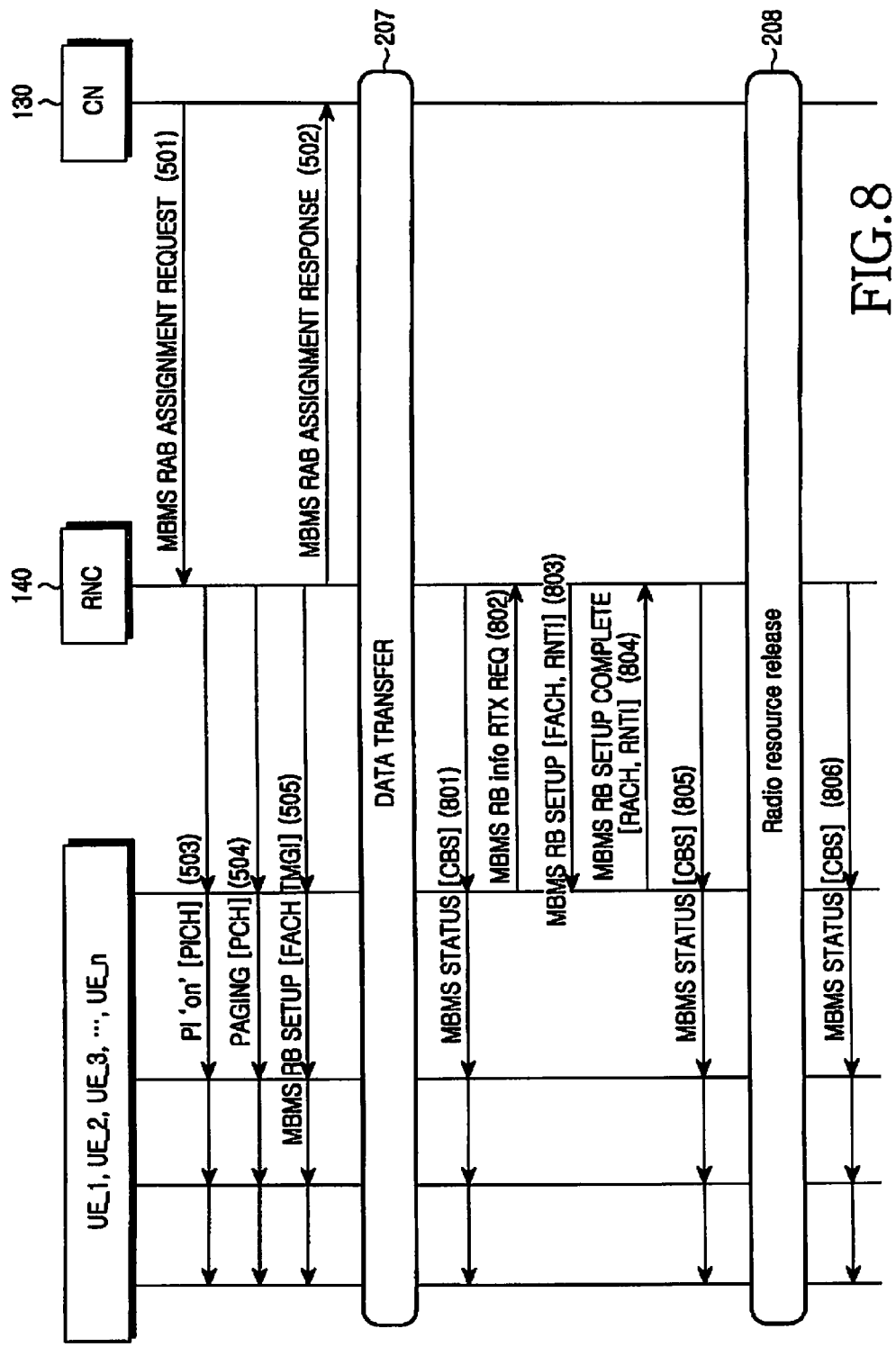
FIG. 8 is a diagram illustrating a signal flow for an RB setup procedure to provide an MBMS service according to another embodiment of the present invention.

FIG. 8 is a diagram illustrating a signal flow for an MBMS RB setup procedure to provide an MBMS service according to the second embodiment of the present invention. In FIG. 8, RB setup-related initial messages directed from the RNC 140 to UEs are delivered by group signaling. Group signaling refers to transmission of a single message commonly from the RNC 140 to a plurality of objects (e.g., UEs or cells). However, retransmitted RB setup-related messages are delivered to UEs by individual signaling. Individual signaling refers to signaling between the RNC 140 and an individual UE. Here, "UEs" denote the UEs requesting an MBMS service within the same cell. The UEs have already completed the MBMS service request procedure of transmitting the ACTIVATE MBMS PDP CONTEXT REQUEST message and receiving the ACTIVATE MBMS PDP CONTEXT REQUEST ACCEPT message.

Referring to FIG. 8, steps 501 to 505 are performed in the same manner as depicted in FIG. 5 to set up MBMS RBs. Therefore, their description is not provided here.

After setup of MBMS RBs, UEs and the SGSN 130 transmit/receive MBMS service data via the MBMS RBs in step 207.

On the other hand, a different signaling is proposed for UEs that failed in the MBMS RB setup. Aside from the MBMS data transfer, the RNC 140 first broadcasts an MBMS STATUS message by the CBS in steps 801, 805 and 806. The MBMS STATUS message is delivered on a cell basis. This message indicates ongoing MBMS services to the UEs of the same cell.

Upon receipt of the MBMS STATUS message, each of the UEs determines whether its intended MBMS service is in progress within the cell. If the intended MBMS service is not provided, the UE performs the typical procedure for receiving MBMS RB info. On the contrary, if the intended MBMS service is already in progress, the UE recognizes that it failed to receive an intended MBMS RB SETUP message.

To describe the operation of the UE in more detail, the UE stores the service ID of its requested MBMS service in a variable MBMS_SERVICE_JOINED. If the UE normally receives the MBMS RB SETUP message in step 505 and starts to receive the MBMS service, it deletes the service ID from the variable and instead, stores the service ID in a variable MBMS_SERVICE_ONGOING. With one or more service IDs stored in MBMS_SERVICE_ONGOING, the UE receives the MBMS STATUS message by the CBS and compares the service ID stored in MBMS_SERVICE_ JOINED with service IDs set in the received message. If the service ID as MBMS_SERVICE_JOINED is found in the message, the UE transmits an MBMS radio bearer information retransmission request (MBMS RB info RTX REQ) message to the RNC 140 by individual signaling in step 802. The MBMS RB info RTX REQ message contains a message type, the UE ID, and the service ID.

Upon receipt of the MBMS RB info RTX REQ message, the RNC 140 checks the service ID in the message and creates an MBMS RB SETUP message containing MBMS RB info about an MBMS service corresponding to the service ID. The RNC 140 transmits the MBMS RB SETUP message to the UE on the FACH in step 803. Since the MBMS RB SETUP message is transmitted to the UE by individual signaling, it does not reach other UEs. For the individual signaling, the RNC 140 sets an ID unique for the UE, RNTI (Radio Network Temporary Identity) in the MBMS RB SETUP message. In accordance with the second embodiment of the present invention, the RNC 140 receives no response messages for MBMS RB info from UEs. Instead, it continuously provides information about ongoing MBMS services and determines from CBS messages received from UEs whether they have received current MBMS RB info. If a UE failed to receive the MBMS RB info, it requests the MBMS RB info from the RNC 140. The RNC 140 then transmits the MBMS RB info only to the requesting UE. Though a UE finds out whether it failed to receive MBMS RB info by information about ongoing MBMS services in the embodiment of the present invention, obviously other methods can be contemplated.

Upon receipt of the MBMS RB SETUP message from the RNC 140, the UE transmits an MBMS RB SETUP COMPLETE message to the RNC in response for the received message. Since the MBMS RB SETUP COMPLETE message is delivered on an RACH, it contains the RNTI of the UE. The individual signaling is the opposite of the group signaling. It is implemented between a single transmitter and a single receiver. The MBMS RB SETUP message is an example of group signaling because one transmitter corresponds to a plurality of UEs.

The novel message proposed in the second embodiment, MBMS STATUS is repeatedly transmitted according to CBS scheduling in steps 801, 805 and 806. The CBS scheduling is known to the UEs by a CBS schedule message to allow the UEs to receive the MBMS STATUS message based on information in the CBS schedule message.

Meanwhile, if an arbitrary MBMS service is terminated, radio resources assigned for the MBMS service are released. The RNC 140 provides information about ongoing MBMS services except the terminated MBMS service by the MBMS STATUS message in step 806.

In accordance with the second embodiment of the present invention as described above, the RNC provides information about MBMS services which are in progress on a cell basis, so that UEs which failed in receiving initial MBMS RB SETUP messages can receive intended MBMS RB info later by individual signaling. Therefore, although the UEs do not transmit a response message for the MBMS RB SETUP message, MBMS services are normally provided.

2.2 Definition of Novel Messages 2.2.1 Schedule Message

FIG. 9 illustrates the structure of a schedule message required for implementation of the second embodiment of the present invention.

Referring to FIG. 9, the schedule message provides information about transmission scheduling of the MBMS STATUS message on a cell basis. The schedule message is delivered to the UEs of each cell. That is, the RNC creates the schedule message for each cell and broadcasts it to the cell. The schedule message contains information about data to be transmitted for one scheduling period. The scheduling period is comprised of a plurality of CTCH BSs (Common Transport Channel Block Sets). A CTCH BS size is defined in the number of radio frames. The schedule message is a high-layer signal and thus shared between UEs and the RNC.

Figure 11:
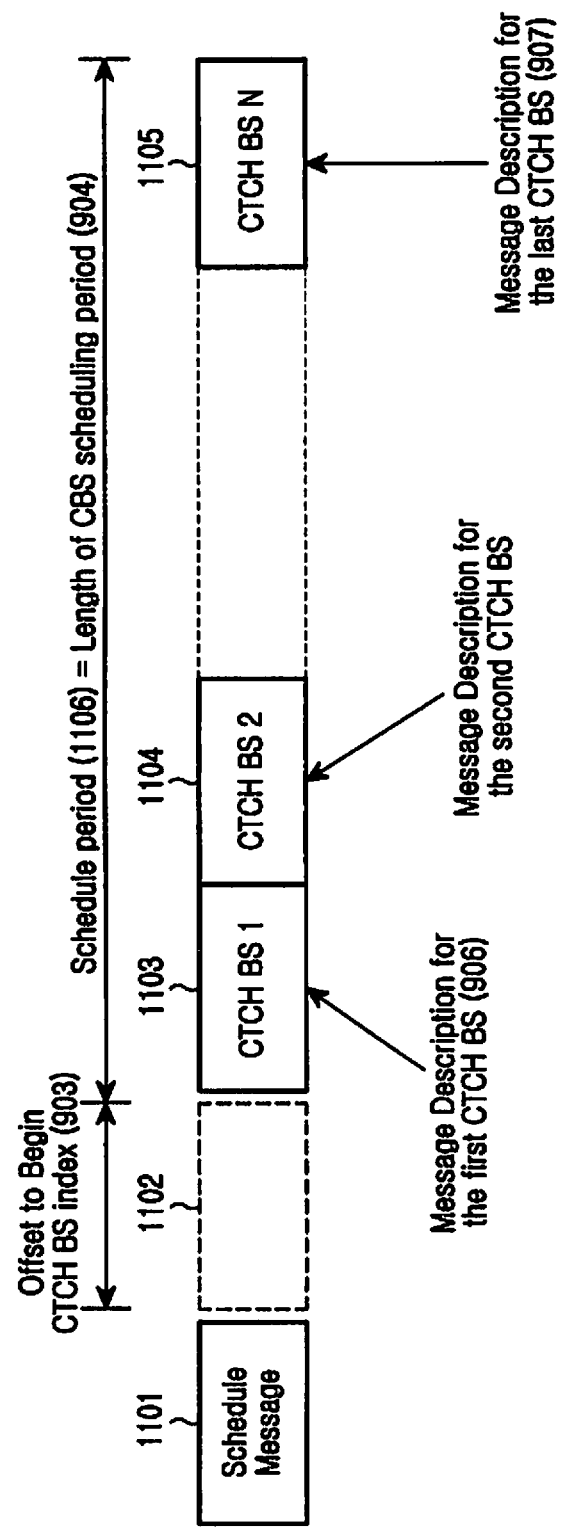
FIG. 11 illustrates an example of CTCH (Common Transport Channel) transmission according to the second embodiment of the present invention.

FIG. 11 illustrates an example of transmitting CTCH BSs for one scheduling period along with the schedule message.

Referring to FIG. 11, one scheduling period 1106 is comprised of as many CTCH BSs as Length of CBS Scheduling Period 904 set in a schedule message 1101. The start point of the scheduling period 1106 is apart from the schedule message 1101 by Offset to Begin CTCH BS Index 903. Message Descriptions 906 to 907 in FIG. 9 describe the CTCH BSs. Message Descriptions match to the CTCH BSs in a one-to-one correspondence. The Message Descriptions include information about the message description types of the CTCH BSs. The message description types are defined by preset values. In the present invention, the message description type of MBMS STATUS is defined as an unused number, '9'. Offset to Begin CTCH BS Index 903 is 8 bits, indicating a value between 1 and 255. Length of CBS Scheduling Period 904 is also 8 bits, indicating a value between 1 and 255.

Upon receipt of the schedule message 1101, UEs supporting the second embodiment of the present invention detect the start and end points of the scheduling period using the offset 903 and the CBS scheduling period length 904, and locate a CTCH BS with a message description type set to 9 using the message descriptions 906 to 907. Thus, the UEs can selectively receive the CTCH BS with a message description type set to 9.

To describe the structure of the schedule message 1101 in brief, its message type is defined as 2. New Message Bitmap 905 indicates whether each CTCH BS is a new or old message. The size of New Message Bitmap 905 is variable depending on the number of CTCH BSs in one scheduling period. For example, if a CTCH BS is set to 0 in the bitmap, the CTCH BS delivers an old message and if it is set to 1, it delivers a new message. As illustrated in FIG. 11, the UEs detect a CTCH BS that delivers the MBMS STATUS message from the schedule message 1101 and selectively receive the CTCH BS.

2.2.2 MBMS STATUS Message

FIG. 10 illustrates the structure of the MBMS STATUS message required for implementation of the second embodiment of the present invention. The shown message is of the same structure as a typical CBS message.

Referring to FIG. 10, Message Type 1051 can be set to an unused value, 4. Message ID 1052 identifies a specific CBS message. In general, a UE identifies the CBS message by Message ID 1052. However, since the UE identifies the MBMS STATUS message by Message Type 1051, Message ID 1052 is actually not effective in the present invention. The RNC sets Message ID 1052 to an unused value prior to transmitting the MBMS STATUS message and the UE stores the message ID value.

Serial Number 1053 is 16 bits, indicating whether the message is an updated version or not. Here, the same message means a CBS message having the same message ID. In the present invention, Serial Number 1053 is changed when the contents of the MBMS STATUS message is modified as an MBMS service is added to or released from a corresponding cell as in steps 805 and 806 in FIG. 8.

Data Coding Scheme 1054 indicates a language applied to the payload of the CBS message, as defined in 3GPP TS 23.081. In the present invention, Data Coding Scheme 1054 has no significance. However, for compatibility with the existing technology, Data Coding Scheme 1054 is set to a value which is not used in 3GPP TS 23.081.

MBMS STATUS Data 1055 is the payload of the MBMS STATUS message. It contains SERVICE IDs 1056 to 1058 in current use for the cell. If IPV6 addresses are used as the SERVICE IDs, the size of the fields is 128 bits.

2.3 UE Operation

Figure 12:
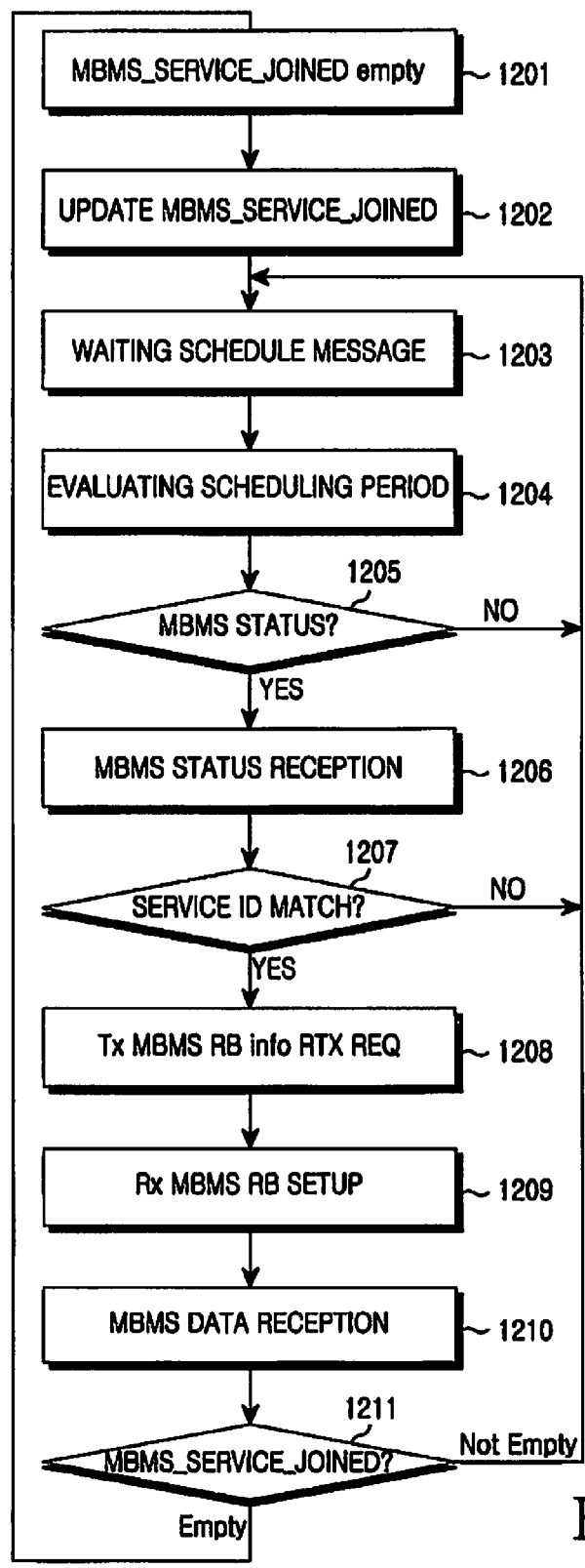
FIG. 12 is a flowchart illustrating the control operation of the UE according to the second embodiment of the present invention.

FIG. 12 is a flowchart illustrating the control operation of a UE according to the second embodiment of the present invention. It is assumed that the UE has requested an MBMS service.

Referring to FIG. 12, after requesting the MBMS service, the UE empties the variable MBMS_SERVICE_JOINED in step 1201. If at least one SERVICE ID is stored in the variable by updating it in step 1202, the UE monitors an S-CCPCH (Secondary-Common Control Physical Channel) servicing the CBS using system information provided on a cell basis in step 1203. Upon receipt of CBS messages on the channel, the UE checks the Message Types of the CBS messages. If a CBS message with Message Type set to 2 is found, the UE evaluates in step 1204 a scheduling period as depicted in FIGS. 8 and 9 and determines in step 1205 whether an MBMS STATUS message exists in the scheduling period. The decision depends on whether the schedule message has Message Description with a message description type set to 9. In the presence of the MBMS STATUS message, the UE receives the MBMS STATUS message in a CTCH BS corresponding to the Message Description in step 1206. In the absence of the MBMS STATUS message, the UE returns to step 1203 and awaits receipt of the next schedule message.

Meanwhile, the UE determines whether the MBMS STATUS message has a service ID stored in MBMS_SERVICE_JOINED in step 1207. If it does, the UE recognizes that it failed to receive an MBMS RB SETUP message for its requested MBMS service from the RNC 140. The UE then transmits an MBMS RB info RTX REQ message to the RNC 140, requesting the MBMS RB SETUP message in step 1208. The MBMS RB info RTX REQ message may be delivered on a DCCH and contains the service ID of the intended MBMS service and the RNTI of the UE. In step 1209, the UE receives the retransmitted MBMS RB SETUP message from the RNC 140. The UE establishes layers according to MBMS RB info set in the received message in step 1210. After preparing for receiving MBMS service data, the UE starts to receive the MBMS service data. The MBMS RB SETUP message is delivered by individual signaling in step 1209.

Once the MBMS service is initiated, the UE deletes the service ID of the MBMS service from MBMS_SERVICE_JOINED and determines whether MBMS_SERVICE_JOINED is empty in step 1211. If it is not empty, the UE returns to step 1203 and repeats the above procedure. On the contrary, if MBMS_SERVICE_JOINED is empty, the UE returns to step 1201 and waits until a new SERVICE ID is added to MBMS_SERVICE_JOINED.

4. RNC Operation

Figure 13:
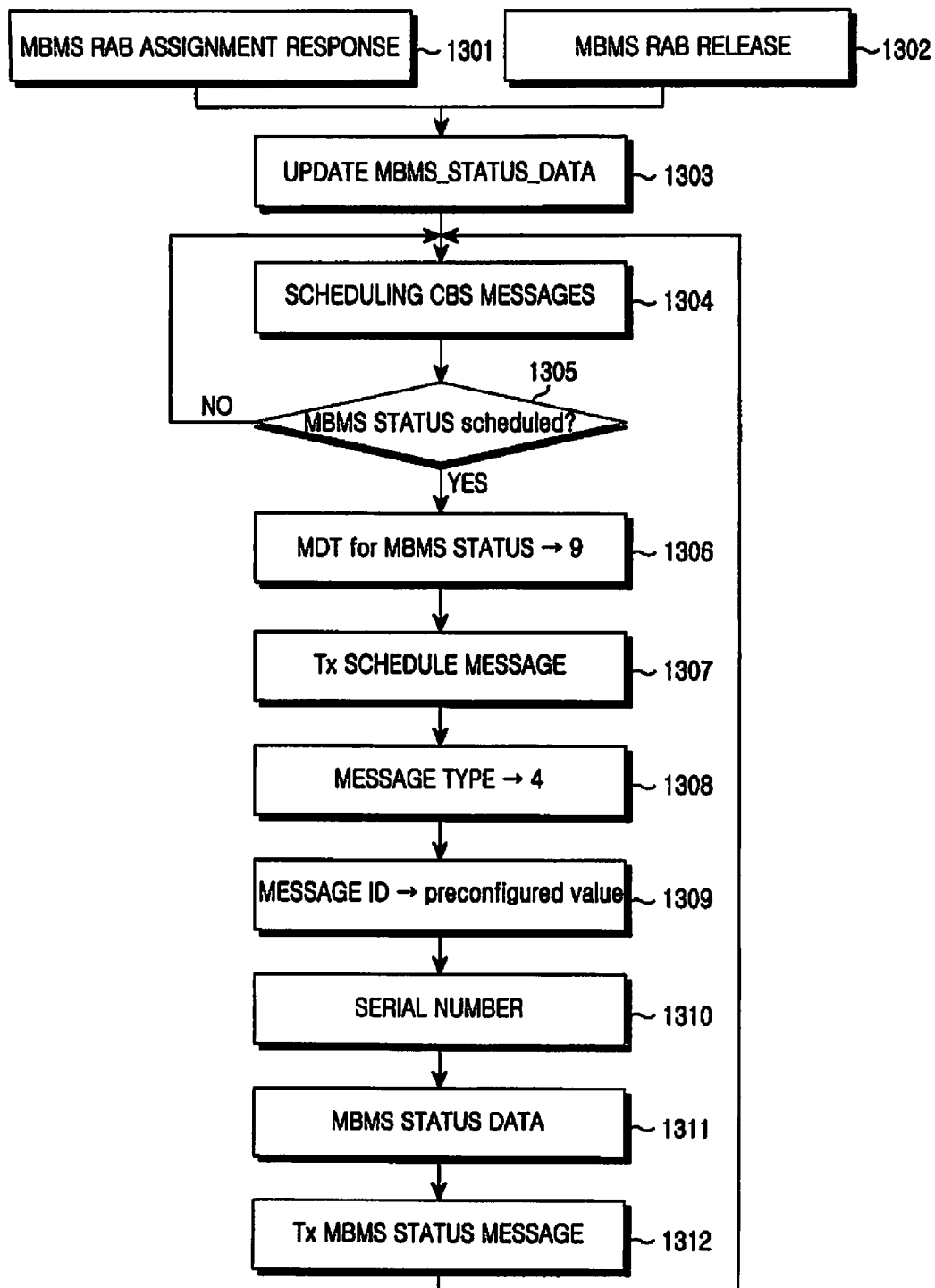
FIG. 13 is a flowchart illustrating the control operation of the RNC according to the second embodiment of the present invention.

FIG. 13 is a flowchart illustrating the control operation of the RNC according to the second embodiment of the present invention.

Referring to FIG. 13, the RNC stores the service IDs of ongoing MBMS services within a cell in a variable MBMS_STATUS_DATA. If the RNC transmits an MBMS RAB ASSIGNMENT RESPONSE message for a new MBMS service in step 1301 or an MBMS RAB RELEASE message indicating termination of a specific ongoing MBMS service in step 1302, it updates MBMS_STATUS_DATA with the service IDs of the initiated or terminated MBMS services in step 1303.

The RNC then schedules CBS messages to be transmitted for the next scheduling period on a cell by cell basis in step 1304 and determines whether to transmit an MBMS STATUS message for the scheduling period in step 1305. If the MBMS STATUS message is to be transmitted, the RNC proceeds to step 1306. Otherwise, it returns to step 1304. In step 1304, the RNC waits until scheduling for the next scheduling period.

On the other hand, the RNC sets the message description type of Message Description corresponding to a CTCH BS delivering the MBMS STATUS message to 9 in step 1306 and transmits a schedule message in step 1307.

The RNC sets Message Type to 4 for the MBMS STATUS message in step 1308 and sets Message ID to a predetermined value for the message in step 1309. The RNC sets Serial Number appropriately in step 1310 and inserts service IDs stored in MBMS_STATUS_DATA in MBMS STATUS Data in step 1311. If MBMS STATUS data is different from the previous transmitted one in step 1311, the RNC sets Serial Number to a different value from the previous Serial Number and if they are identical, the RNC sets Serial Number to the same value as the previous Serial Number in step 1310.

The RNC 140 transmits the MBMS STATUS message in step 1312 and returns to step 1304.

In accordance with the present invention as described above, UEs need not transmit a response message for an MBMS RB SETUP message requesting setup of MBMS RBs for provisioning of a particular MBMS service in an MBMS-providing mobile communication system. Therefore, the use efficiency of radio resources is increased and system performance degradation, which might otherwise occur due to simultaneous transmission of response messages, can be prevented.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of a base station in a wireless communication system, the method comprising:
   transmitting, to at least one terminal, a first message including a scheduling period and an offset, wherein the scheduling period includes a plurality of radio frames;

transmitting, to the at least one terminal, a second message including control information about one or more multimedia broadcast/multicast services (MBMSs) that are ongoing, based on the scheduling period and the offset; and transmitting, to the at least one terminal, data of the one or more MBMSs related to the control information, wherein the control information includes a temporary multicast group identity (TMGI) and a list of the one or more MBMSs that are ongoing.

2. The method of claim 1, wherein transmitting the first message and the second message to the at least one terminal are performed in a type of broadcast within a coverage area of a cell.

3. The method of claim 1, wherein the first message includes third information about a data coding scheme applied to the second message.

4. A method of a terminal in a wireless communication system, the method comprising:

receiving, from a base station, a first message including a scheduling period and an offset, wherein the scheduling period includes a plurality of radio frames;

receiving, from the base station, a second message including control information about one or more multimedia broadcast/multicast services (MBMSs) that are ongoing, based on the scheduling period and the offset; and receiving, from the base station, data of at least one of the one or more MBMSs related to the control information, wherein the control information includes a temporary multicast group identity (TMGI) and a list of the one or more MBMSs that are ongoing.

5. The method of claim 4, wherein the first message and the second message are broadcasted within a coverage area of a cell.

6. The method of claim 4, wherein the first message includes third information about a data coding scheme applied to the second message.

7. An apparatus of a base station in a wireless communication system, the apparatus comprising:

a transceiver; and a controller configured to control the transceiver to:

transmit, to at least one terminal, a first message including a scheduling period and an offset, wherein the scheduling period comprising a plurality of radio frames, transmit, to the at least one terminal, a second message including control information about one or more multimedia broadcast/multicast services (MBMSs) that are ongoing, based on the scheduling period and the offset, and transmit, to the at least one terminal, data of the one or more MBMSs related to the control information, wherein the control information comprises a temporary multicast group identity (TMGI) and a list of the one or more MBMSs that are ongoing.

8. The apparatus of claim 7, wherein the transceiver transmits the first message and the second message to the at least one terminal in a type of broadcast within a coverage area of a cell.

9. The apparatus of claim 7, wherein the first message comprises third information about a data coding scheme applied to the second message.

10. An apparatus of a terminal in a wireless communication system, the apparatus comprising:

a transceiver; and a controller configured to control the transceiver to:

receive, from a base station, a first message including a scheduling period and an offset, wherein the scheduling period includes a plurality of radio frames, receive, from the base station, a second message including control information about one or more multimedia broadcast/multicast services (MBMSs) that are ongoing, based on the scheduling period and the offset, and receive, form the base station, data of at least one of the one or more MBMSs related to the control information, wherein the control information comprises a temporary multicast group identity (TMGI) and a list of the one or more MBMSs that are ongoing.

11. The apparatus of claim 10, wherein the first message and the second message are broadcasted within a coverage area of a cell.

12. The apparatus of claim 10, wherein the first message comprises third information about a data coding scheme applied to the second message.

* * * * *